(12) United States Patent
Jiang et al.

(10) Patent No.: US 11,038,189 B2
(45) Date of Patent: Jun. 15, 2021

(54) CERIUM NANOFIBER ADDITIVES FOR IMPROVED FUEL CELL DURABILITY

(71) Applicant: GM Global Technology Operations LLC, Detroit, MI (US)

(72) Inventors: Ruichun Jiang, Troy, MI (US); Frank D. Coms, Fairport, NY (US); Timothy J. Fuller, Palm Bay, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 16/410,584

(22) Filed: May 13, 2019

(65) Prior Publication Data
US 2020/0365924 A1    Nov. 19, 2020

(51) Int. Cl.
*H01M 8/126* (2016.01)
*H01M 8/1004* (2016.01)
*H01M 8/1213* (2016.01)
*H01M 8/1253* (2016.01)

(52) U.S. Cl.
CPC ......... *H01M 8/126* (2013.01); *H01M 8/1004* (2013.01); *H01M 8/1213* (2013.01); *H01M 8/1253* (2013.01)

(58) Field of Classification Search
None
See application file for complete search history.

(56) References Cited

U.S. PATENT DOCUMENTS

2012/0141919 A1* 6/2012 Lee ............... H01M 8/1004
429/524
2015/0287967 A1* 10/2015 Joo ................ H01M 2/1613
429/144

* cited by examiner

*Primary Examiner* — Daniel S Gatewood
(74) *Attorney, Agent, or Firm* — Quinn IP Law

(57) ABSTRACT

A membrane electrode assembly component for a fuel cell includes a generally planar gas-permeable body having opposed first and second faces defining in-plane and through-plane directions, a side face extending about an outer perimeter of the body and adjoining each of the first and second faces, and an active region bounded by the first and second faces and an active region perimeter defined generally within the outer perimeter. The active region includes a distribution of cerium-zirconium oxide nanofibers dispersed across at least one of the in-plane and through-plane directions, wherein the cerium-zirconium oxide nanofibers have a molecular formula of $Ce_xZr_yO_4$.

19 Claims, 4 Drawing Sheets

CERIUM NANOFIBER ADDITIVES FOR IMPROVED FUEL CELL DURABILITY

This disclosure relates to cerium additives in nanofiber form for improving fuel cell durability.

Fuel cells are electrochemical conversion devices that produce electrical energy by the oxidation and reduction, respectively, of hydrogen and oxygen. One of the factors that determines the commercial viability of a fuel cell is its durability. For example, a fuel cell for an automotive vehicle may be tasked to provide at least 5,000 hours of service. Such a high durability requirement may present a challenge to one or more of the fuel cell's membrane-electrode assembly (MEA) components, such as the polymer electrolyte membrane (PEM), the catalyst layers (CLs), the gas diffusion layers (GDLs), the micro-porous layers (MPLs) and any subgaskets used in the MEA.

Various mechanical and chemical factors may contribute to the degradation of an MEA component in a fuel cell. For example, in a perfluorosulfonic acid PEM membrane utilizing cerium as a radical scavenger, cationic species such as $Ce^{3+}$ are complexed to the negatively charged sulfonate groups of the ionomer. In an operating fuel cell, factors such as a non-homogeneous water distribution in the plane of the PEM membrane can result in some areas across the PEM's active region that are comparatively "wet" (i.e., having a higher relative humidity (RH)) and other areas that are comparatively "dry" (i.e., having a lower RH). Complexed cations such as $Ce^{3+}$ may migrate from relatively wet areas and concentrate in drier areas of the PEM/MEA. In extreme cases of disparate water distribution, $Ce^{3+}$ can be severely depleted in certain wet regions, leading to early membrane degradation around these wet regions.

SUMMARY

According to one embodiment, a membrane electrode assembly component includes a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter. The active region may include a distribution of cerium-zirconium oxide nanofibers dispersed across at least one of the in-plane and through-plane directions, wherein the cerium-zirconium oxide nanofibers have a molecular formula of $Ce_xZr_yO_4$.

The distribution of nanofibers may be substantially uniform across the at least one of the in-plane and through-plane directions, or it may vary across the at least one of the in-plane and through-plane directions. The distribution may be disposed as a coating on a surface of the active region, and/or it may be disposed throughout a volume of the active region.

The cerium-zirconium oxide nanofibers may be made of a composite compound of cerium oxide and zirconium oxide, and may have an average fiber length of about 10-900 nm. The molecular formula may be one of $CeZrO_4$ and $Ce_xZr_{1-x}O_4$ (e.g., $Ce_{0.5}Zr_{0.5}O_4$) and the membrane electrode assembly component may be one of a polymer-electrolyte membrane, a gas diffusion layer, a micro-porous layer, a catalyst layer and a subgasket.

According to one embodiment, a membrane electrode assembly component may include a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter. The active region may include a distribution of cerium-zirconium oxide nanofibers having a molecular formula of one of $CeZrO_4$ and $Ce_xZr_{1-x}O_4$ dispersed across at least one of the in-plane and through-plane directions.

The distribution of nanofibers may be substantially uniform across the at least one of the in-plane and through-plane directions, or it may vary across the at least one of the in-plane and through-plane directions. The distribution may be disposed as at least one of (i) a coating on a surface of the active region, and (ii) a distribution throughout a volume of the active region. The cerium-zirconium oxide nanofibers may be made of a composite compound of cerium oxide and zirconium oxide, and may have an average fiber length of about 10-900 nm. The molecular formula may be one of $CeZrO_4$ and $Ce_xZr_{1-x}O_4$ (e.g., $Ce_{0.5}Zr_{0.5}O_4$) and the membrane electrode assembly component may be one of a polymer-electrolyte membrane, a gas diffusion layer, a micro-porous layer, a catalyst layer and a subgasket.

According to one embodiment, a membrane electrode assembly for a fuel cell includes a polymer-electrolyte membrane sandwiched between an anode and a cathode. At least one of the polymer-electrolyte membrane, the anode and the cathode has a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter, wherein the active region includes a distribution of cerium-zirconium oxide nanofibers dispersed across at least one of the in-plane and through-plane directions, and wherein the cerium-zirconium oxide nanofibers have a molecular formula of $Ce_xZr_yO_4$.

The distribution of nanofibers may be substantially uniform across the at least one of the in-plane and through-plane directions, or it may vary across the at least one of the in-plane and through-plane directions. The distribution may be disposed as at least one of (i) a coating on a surface of the active region, and (ii) a distribution throughout a volume of the active region. The cerium-zirconium oxide nanofibers may be made of a composite compound of cerium oxide and zirconium oxide, and may have an average fiber length of about 10-900 nm. The molecular formula may be one of $CeZrO_4$ and $Ce_xZr_{1-x}O_4$ (e.g., $Ce_{0.5}Zr_{0.5}O_4$) and the membrane electrode assembly component may be one of a polymer-electrolyte membrane, a gas diffusion layer, a micro-porous layer, a catalyst layer and a subgasket.

BRIEF DESCRIPTION OF THE DRAWINGS

FIG. 2-1 is an X-ray fluorescence mapping of cerium distribution in an MEA containing $Ce(NO_3)_3$ according to an embodiment of the disclosure.

FIG. 2-2 is an X-ray fluorescence mapping of cerium distribution in an MEA containing $Ce_{0.5}Zr_{0.5}O_4$ nanofibers according to an embodiment of the disclosure.

FIG. 5-1 is a schematic front view of an MEA component according to an embodiment of the disclosure.

FIG. 5-2 is a schematic side view of an MEA component according to an embodiment of the disclosure.

FIG. 5-3 is a close-up view of the dashed region of FIG. 5-2, showing a distribution of $Ce_xZr_yO_4$ nanofibers varying in a through-plane direction according to an embodiment of the disclosure.

FIG. 5-4 is a schematic perspective view of an MEA component according to an embodiment of the disclosure.

FIG. 6-1 is a schematic front view of an MEA component showing a distribution of $Ce_xZr_yO_4$ nanofibers varying in a linear in-plane direction according to an embodiment of the disclosure.

FIG. 6-2 is a schematic front view of an MEA component showing a distribution of $Ce_xZr_yO_4$ nanofibers varying in a radial in-plane direction according to an embodiment of the disclosure.

Note that some of the drawings herein are subdivided into multiple related views, with all the related views sharing a common "root" figure number and each individual view having its own unique "dash" figure number. For example, FIGS. 2-1 and 2-2 are X-ray fluorescence mappings of cerium distribution in an MEA containing $Ce(NO_3)_3$ and $Ce_{0.5}Zr_{0.5}O_4$ nanofibers, respectively, according to an embodiment of the disclosure; both related views share the same "root" number (i.e., 2), and each individual view has its own unique "dash" number (i.e., −1 and −2). When drawings are subdivided in this way, reference may be made herein to the "root" figure number alone to refer collectively to all the associated "dash" numbers; thus, "FIG. 2" refers to FIGS. 2-1 and 2-2 collectively. Likewise, "FIG. 5" refers to FIGS. 5-1 through 5-4 collectively.

DETAILED DESCRIPTION

Figure 1:
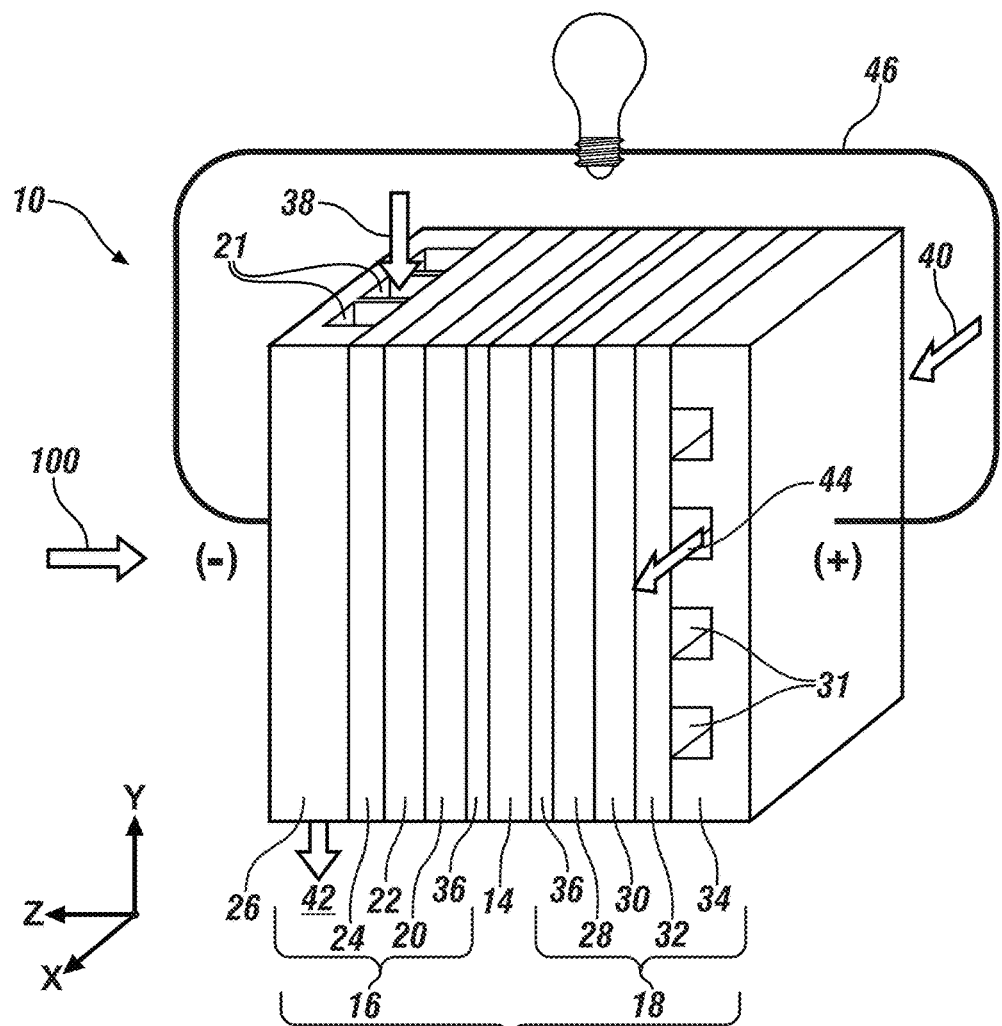
FIG. 1 is a schematic perspective view of a fuel cell according to an embodiment of the disclosure.

Referring now to the drawings, wherein like numerals indicate like parts in the several views, an MEA component 48, and an MEA 12 and a fuel cell 10 including one or more of those MEA components 48, are shown and described herein.

FIG. 1 shows a schematic representation of a fuel cell 10. As viewed in the drawing, the fuel cell 10 includes a PEM 14 sandwiched between an anode 16 to the left and a cathode 18 to the right. Proceeding outward from the PEM 14, the anode 16 includes a catalyst layer 20, a micro-porous layer 22, a gas diffusion layer 24 and a bipolar plate 26. Similarly, proceeding outward from the PEM 14, the cathode 18 includes a catalyst layer 28, a micro-porous layer 30, a gas diffusion layer 32 and a bipolar plate 34. While subgaskets 36 are shown on either side of the PEM 14, these subgaskets 36 are optional and may be disposed between any of the aforementioned layers. Alternatively, subgaskets 36 may be incorporated into the structure of any of these layers. Collectively, the PEM 14, the CLs 20, 28, the MPLs 22, 30, the GDLs 24, 32 and any subgaskets 36 make up the MEA 12. Thus, the PEM 14, the CLs 20, 28, the MPLs 22, 30, the GDLs 24, 32 and the subgaskets 36 may be referred to herein as MEA components 48. Note, however, that while each of the anode 16 and cathode 18 is shown and described as having a respective CL 20, 28, a respective MPL 22, 30, and a respective GDL 24, 32, the functions of one or more of these components 48 may be combined with one or more other components 48, such that the respective functions of the CL, MPL and GDL do not have to be separated into individual components 48. Also, the terms "anode" 16 and "cathode" 18 may be used to refer to one or two of the three MEA electrode components described herein (i.e., the CL, the MPL and the GDL). For example, an "anode" 16 may include one or two of the anode CL 20, the anode MPL 22 and the anode GDL 24, and a "cathode" 18 may include one or two of the cathode CL 28, the cathode MPL 30 and the cathode GDL 32.

A fuel such as hydrogen gas 38 may enter flow channels 21 formed in the anode bipolar plate 26 (e.g., from the "top" of the fuel cell 10) and flow across the anode GDL 24. Some portion of this hydrogen gas 38 may flow through the GDL 24, while the remaining portion of the gas 42 exits the anode bipolar plate 26 (e.g., out the "bottom" of the fuel cell 10). Likewise, oxygen or air 40 may enter flow channels 31 formed in the cathode bipolar plate 34 (e.g., from the "back" of the fuel cell 10) and flow across the cathode GDL 32. Some portion of the oxygen or air 40 may flow through the GDL 32, while the remaining portion of the oxygen or air (plus some water) 44 exits the cathode bipolar plate 34 (e.g., out the "front" of the fuel cell 10). As the hydrogen gas 38 that enters the anode GDL 24 and other anode layers is oxidized, the hydrogen atoms' electrons are stripped off and flow in an electrical circuit 46 from the anode bipolar plate 26 to the cathode bipolar plate 34. Meanwhile, the remaining portions of the oxidized hydrogen atoms—i.e., their nuclei, which are protons—are transported across the fuel cell 10 from the anode 16 side to the cathode 18 side, where they combine with some of the incoming oxygen 40 and the anode-derived electrons which were introduced to the electrical circuit 46 to form water 44 which exits the fuel cell 10.

Note that the reference arrow 100 in FIG. 1 points from the left side of the drawing toward the anode bipolar plate 26. The arrow 100 points in the same direction as looking from the anode 16 or "(−)" side of the fuel cell 10 to the cathode 18 or "(+)" side of the fuel cell 10. This arrow 100 represents a view or perspective of the fuel cell 10 and its various components (including the MEA 12 and its individual MEA components 48) which is used in the present disclosure, along with the X—Y—Z axes shown in FIG. 5-4 as applied to an individual MEA component 48, to define certain directional descriptions. For example, the Y axis points "upward" in a positive direction toward a "top" side or edge 51 of the MEA component 48, the X axis points "rightward" in a positive direction toward a "right" side or edge 57 of the MEA component 48, and the Z axis points in a positive direction toward the anode 16 or "(−)" side of the fuel cell 10. Therefore, the negative direction of the Y axis points "downward" toward a "bottom" side or edge 53 of the MEA component 48, the negative direction of the X axis points "leftward" toward a "left" side or edge 55 of the MEA component 48, and the negative direction of the Z axis points toward the cathode 18 or "(+)" side of the fuel cell 10. Also note that the MEA component 48 has a generally planar body 50; that is, its X and Y dimensions (e.g., its length and width) are much larger than its Z dimension (e.g., its thickness). The generally planar body 50 has a first surface or face 52 facing in the anode 16 or "(−)" or positive Z direction, and a second surface or face 54 opposed from the first surface or face 52 and facing in the cathode 18 or "(−)" or negative Z direction. The generally planar shape of the body 50 and faces 52, 54 define in-plane or transverse directions 56 (e.g., X and Y directions, and other directions coplanar with the X—Y plane) and a through-plane direction 58 (e.g., a Z direction). Note that the foregoing directional conventions are presented merely for convenience and for facilitating the descriptions used in the present disclosure.

Figures 1, 2:
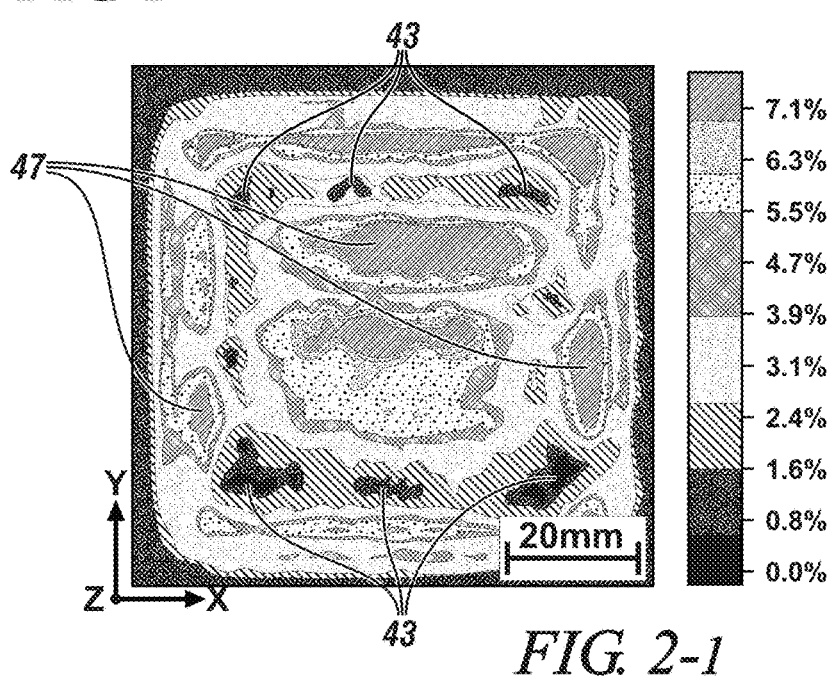
Figure 2:
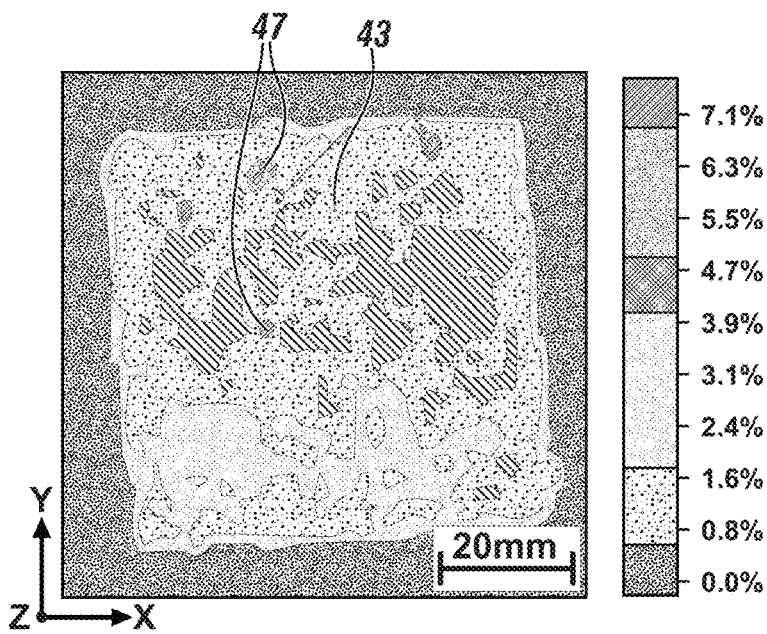

As mentioned above, during operation a fuel cell 10 can produce a non-homogeneous water distribution in the plane of the PEM 14 and other components 48 of the MEA 12, resulting in some areas that are wetter or drier than other areas. FIG. 2-1 shows an X-ray fluorescence (XRF) mapping of the cerium distribution in a reference MEA 12 to which $Ce(NO_3)_3$ was introduced, which exemplifies this effect. (The $Ce(NO_3)_3$ was introduced as a salt, with the $Ce^{3+}$ ions being exchanged into the MEA 12 and the $NO_3^-$ ions being excluded by the sulfonate groups of the polymeric ionomer. $Ce^{3+}$ cations introduced to the ionomer in this manner respond to the local water content of the MEA 12 and are therefore mobile throughout the entire ionomer phase of the MEA 12.) The MEA 12 containing mobile $Ce^{3+}$ ions was assembled into a fuel cell 10 and the cell 10 was operated at 80° C., 50% RH and 1 A/cm² current density for a duration of 80 hours. At the end of 80 hours, the cell 10 was carefully disassembled, and the entire intact MEA assembly (including the subgaskets) was submitted for XRF mapping for cerium content using a Bruker M4 Tornado with a rhodium anode and two 30 mm) (Flash SDD detectors. An energy dispersive spectroscopy (EDS) signal was collected on-the-fly using both detectors. As shown in FIG. 2-1, certain areas 47 exhibited much higher concentrations of cerium than other areas; these areas 47 correspond to regions of the MEA 12 that were "more dry" than other regions, and toward which the cerium ions tended to migrate. Other areas 43 exhibited much lower concentrations of cerium than other areas; these areas 43 correspond to regions of the MEA 12 that were "more wet" than other regions. These wetter areas 43 were therefore more cerium-depleted than other areas, and these areas 43 were also locations where fuel cell failures are often observed more frequently than in other locations.

In contrast, FIG. 2-2 shows an XRF mapping of the cerium distribution for an MEA 12 containing MEA components 48 (having a different cerium additive, as further described below) according to the present disclosure. The same operating conditions and the same fuel cell hardware (i.e., bipolar plates 26, 34 and other supporting hardware other than the MEA 12) used for testing the MEA 12 containing mobile $Ce^{3+}$ as shown in FIG. 2-1 were also used for testing the MEA 12 containing MEA components 48 according to the present disclosure as shown in FIG. 2-2. Note that the cerium distribution appears much more uniform, with only a few very small regions 47 that depart from this uniformity.

Figure 4:
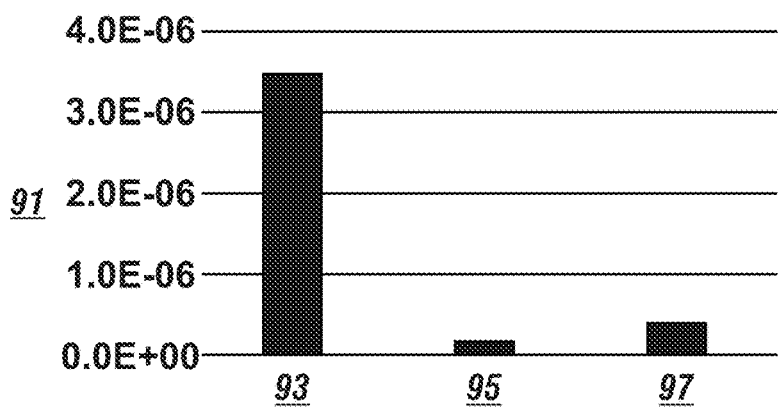
FIG. 4 is a plot of fluoride release rate (FRR) vs. open circuit voltage (OCV) test results for cases of no cerium added, $Ce(NO_3)_3$ added and $Ce_{0.5}Zr_{0.5}O_4$ nanofibers added according to an embodiment of the disclosure.

The two MEA configurations whose test results are shown in FIG. 2-1 (i.e., an MEA 12 containing mobile $Ce^{3+}$) and FIG. 2-2 (i.e., an MEA 12 containing a cerium additive according to the present disclosure), as well as an MEA 12 configuration without cerium introductions or additives, were then subjected to chemical durability tests under open circuit voltage (OCV) conditions. Each MEA 12 configuration was assembled in the same fuel cell hardware and subjected to the same OCV conditions, including a standard test procedure at 95° C. and 25% RH for 300 hours of duration. Under these conditions, the MEAs 12 were subject to chemical degradation due to the production of oxidants including hydroxyl radicals (•OH) and hydrogen peroxide ($H_2O_2$). During this test, the fuel cell OCV, as well as the fluoride release rate (FRR), were evaluated and recorded. FIG. 4 shows the FRR data (i.e., the averages of the FRR throughout the test duration, where a lower average FRR is better) for the MEA 12 having no cerium introduction or additive 93, the MEA 12 containing mobile $Ce^{3+}$ 95, and the MEA 12 utilizing a cerium additive according to the present disclosure 97 (as further explained below). As indicated by the FRR data, where the vertical column 91 measures FRR in units of gF/cm²/s, the two MEAs 12 containing cerium introductions or additives 95, 97 demonstrated better durability than the MEA 12 without cerium introductions or additives 93. Also, the two MEAs 12 containing cerium introductions or additives 95, 97 exhibited similarly low average FRR, and therefore similarly good chemical durability.

Figure 3:
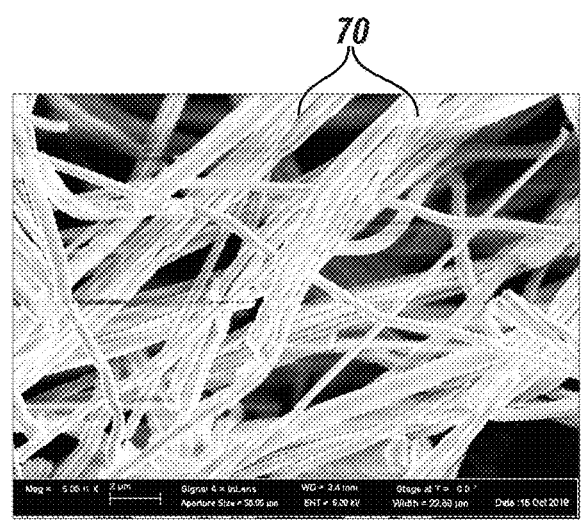
FIG. 3 is a scanning electron micrograph of $Ce_{0.5}Zr_{0.5}O_4$ nanofibers according to an embodiment of the disclosure.
Figures 1, 5:
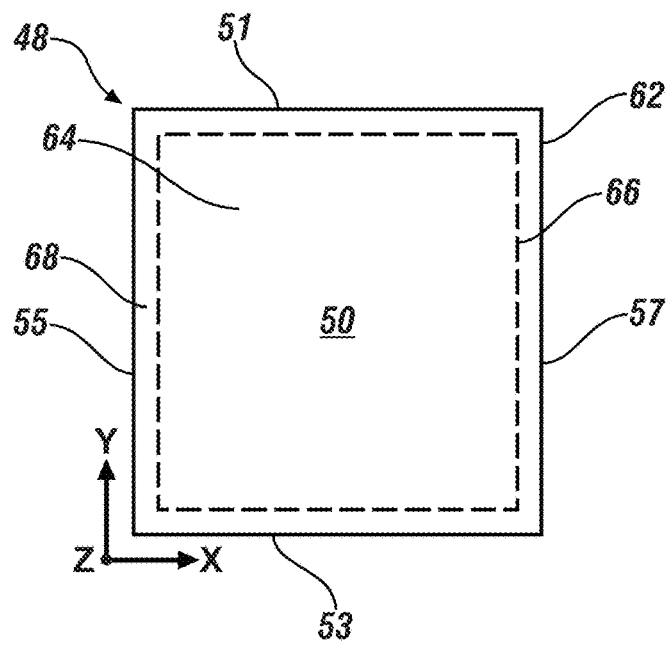
Figures 2, 5:
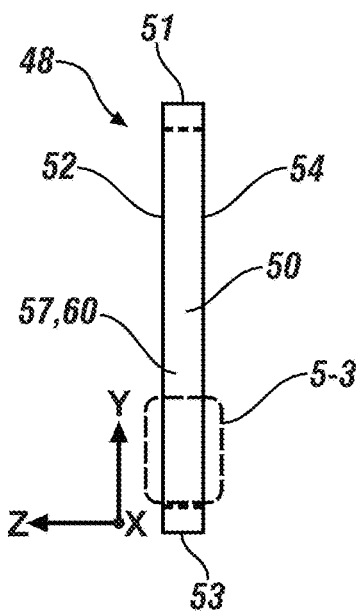
Figures 3, 5:
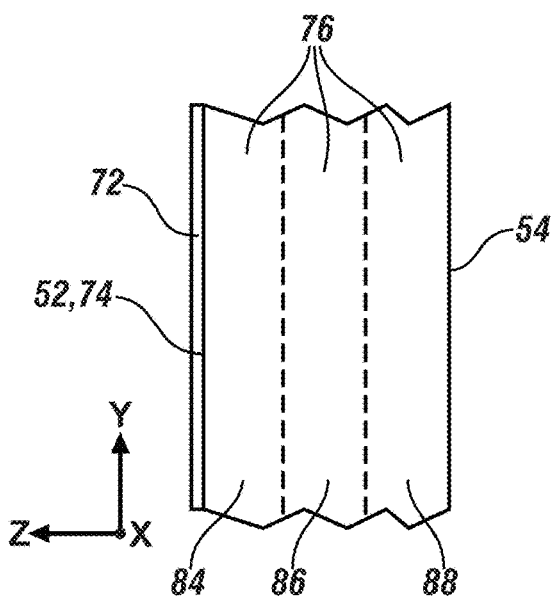
Figures 4, 5:
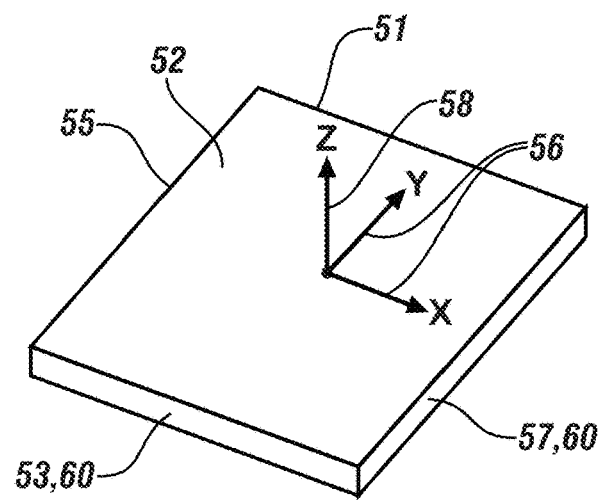
Figures 1, 6:
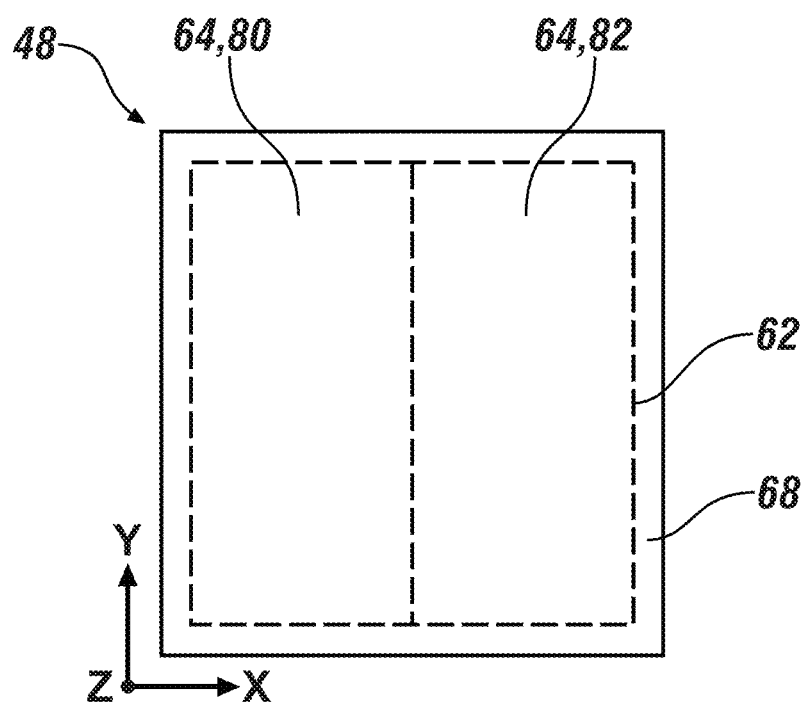
Figures 2, 6:
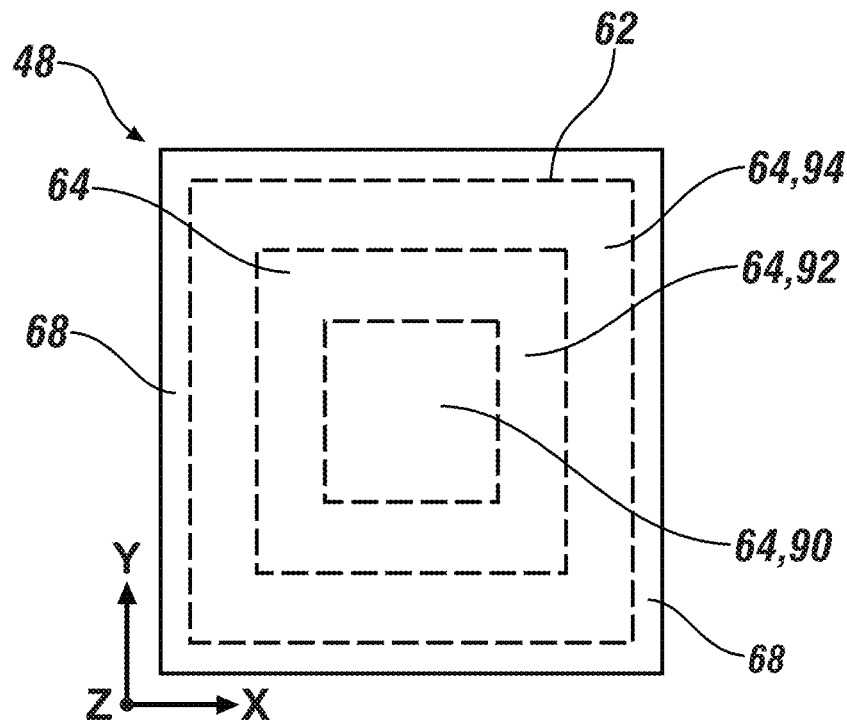

Referring now to FIGS. 3, 5 and 6, various embodiments are shown of an MEA component 48 according to the present disclosure. As mentioned above, the PEM 14, the CLs 20, 28, the MPLs 22, 30, the GDLs 24, 32 and the subgaskets 36 may each be an MEA component 48. The MEA component 48 has a generally planar gas-permeable body 50 having opposed first and second faces 52, 54 defining in-plane directions 56 and a through-plane direction 58. A side face 60 extends about an outer perimeter 62 of the body and adjoins each of the first and second faces 52, 54. An active region 64 is bounded in the Z or through-plane direction 58 by the first and second faces 52, 54, and is bounded in the X and Y or in-plane directions 56 by an active region perimeter 66 which is defined generally within or inside of the outer perimeter 62. As illustrated in FIG. 5-1, a rectangular MEA component 48 may have a rectangular active region 64 and a corresponding rectangular active region perimeter 66 (represented by the dashed rectangle) which may be spaced apart from the outer perimeter 62. In this figure, the outer perimeter 62 is made up of the top edge 51, the bottom edge 53, the left edge 55 and the right edge 57. It should be noted that while all segments of the active region perimeter 66 are illustrated in FIGS. 5 and 6 as being evenly spaced apart from and within the outer perimeter 62, various segments of the active region perimeter 66 may be spaced apart from the outer perimeter 62 by differing amounts. (In other words, some portions of the active region perimeter 66 may lie closer to the outer perimeter 62 than other portions. Also, some or all portions of the active region perimeter 66 may lie coincident with the outer perimeter 62.)

The active region 64 includes a distribution of cerium-zirconium oxide nanofibers 70 across at least one of the in-plane and through-plane directions 56, 58, wherein the cerium-zirconium oxide nanofibers 70 have a molecular formula of $Ce_xZr_yO_4$. FIG. 3 shows a scanning electron micrograph (SEM) of $Ce_{0.5}Zr_{0.5}O_4$ nanofibers 70. These nanofibers 70 may be made of a composite compound of cerium oxide and zirconium oxide (i.e., ceria and zirconia), and may have an average fiber length of about 10-900 nm. The molecular formula of the nanofibers 70 may be $CeZrO_4$ (i.e., where x=1 and y=1), $Ce_xZr_{1-x}O_4$ (where y=1−x, such as $Ce_{0.5}Zr_{0.5}O_4$) or other cerium-zirconium oxides in nanofiber form.

The distribution of nanofibers 70 may be substantially uniform across one or more of the in-plane and through-plane directions 56, 58, or it may vary across one or more of the in-plane and through-plane directions 56, 58. For example, the distribution of nanofibers 70 in the MEA component 48 shown in FIG. 5-1 may be uniform across both the X and Y in-plane directions of active region 64, or it may be uniform across one of those directions and non-uniform/varying across the other of those directions. In FIG. 6-1, two areas 80, 82 of the active region 64 are shown; here, one of these areas 80, 82 may have a concentration of nanofibers 70 which is different (i.e., higher or lower) as compared to the concentration of nanofibers 70 in the other of the areas 80, 82. Likewise, in FIG. 6-2, three concentric areas or zones 90, 92, 94 of the active region 64 are shown; here, the concentration of nanofibers 70 may vary radially from one area 90 to the other 92 and to the other 94. Note that while the distribution of nanofibers 70 discussed herein has focused on the active region 64 of the MEA component 48, the nanofibers 70 may also be distributed within the inactive region 68 which lies between the active region perimeter 66 and the outer perimeter 62.

Referring now to FIG. 5-3, in which a close-up side view of an MEA component 48 is shown, the distribution of cerium-zirconium oxide nanofibers 70 may be disposed as a coating 72 on one or more surfaces 52, 54 of the active region 64 (such as the anode-facing surface 74). It may also be disposed throughout an interior volume 76 of the active region 64. In FIG. 5-3, three parallel sections or thicknesses 84, 86, 88 are shown; here, the concentration of nanofibers 70 may vary among these sections 84, 86, 88. For example, it may be desired that the concentration of nanofibers 70 is higher toward the anode-facing side, so the concentration may be highest in section 84, lowest in section 88, and somewhere between highest and lowest in section 86.

According to one embodiment, an MEA 12 for a fuel cell 10 may include a PEM 14 sandwiched between an anode 16 and a cathode 18. At least one of the PEM, the anode 16 and the cathode 18 has a generally planar gas-permeable body 50 having opposed first and second faces 52, 54 defining in-plane (i.e., X and Y) transverse directions 56 and a through-plane (i.e., Z or thickness) direction 58, a side face 60 extending about an outer perimeter 62 of the body 50 and adjoining each of the first and second faces 52, 54, and an active region 64 bounded in the through-plane direction 58 by the first and second faces 52, 54 and in the in-plane directions 56 by an active region perimeter 66 defined generally within the outer perimeter 62, wherein the active region 64 includes a distribution of cerium-zirconium oxide nanofibers 70 dispersed or distributed across at least one of the in-plane and through-plane directions 56, 58, and wherein the cerium-zirconium oxide nanofibers 70 have a molecular formula of $Ce_xZr_yO_4$.

As indicated by the test results shown in FIGS. 2 and 4, MEA components 48 using cerium-zirconium oxide nanofiber additives according to the present disclosure appear to help stabilize and mitigate the migration of $Ce^{3+}$ cations in fuel cells 10, thereby enhancing fuel cell mechanical and chemical durability. One example of producing such MEA components 48 is as follows.

First, a coating solution may be prepared containing the additive 70 and an ionomer. An amount of $Ce_{0.5}Zr_{0.5}O_4$ (such as that shown in FIG. 3) or other cerium-zirconium oxide nanofiber additive 70 and ionomer solution (Nafion® DE2020) are added into a solvent and stirred. Suitable solvents include water, alcohols and/or organic liquids. For example, a solution may be prepared having an additive-to-ionomer ratio in the range from 1:99 to 1:2 by weight, to get 1 to 33.5 wt % of nanofiber additives 70 inside of the dry membranes/components 48.

Next, the additive coating solution may be applied to the dry MEA component 48. An Erichsen coater with 10 inches by 15 inches of active membrane coating area may be used for membrane preparation. Dry membranes may be coated on a backer film (e.g., 50 μm polytetrafluoroethylene film). Multilayer membranes 48 may be prepared via a layer-by-layer procedure, using a series of single-step procedures with the coating height adjusted for each layer. A Bird applicator (Paul E. Gardner Co.) with selected slot thickness (in the range of 25-150 μm) may be used to coat each membrane layer with the additive/ionomer mixture. The thickness of each membrane layer may be controlled by the height of the Bird applicator slot which determines the amount of solution applied and the concentration of the coating solution. For the layer-by-layer procedure applied in this example, to ensure biaxial direction of the nanofiber additives 70, multiple coating passes in alternating X and Y directions may be conducted for the layers treated with additives 70, with the obtained thickness of each pass being less than about 2 μm after drying. For multi-layer membranes 48, the total thickness of all membrane layers together may be around 12 μm (or otherwise as desired). The coated membranes 48 may then be dried at 25° C., 50% RH for 30 minutes, and then heat-treated at a temperature of typically between 250 to 300° F. for one to twelve hours.

The single-layer or multilayer MEA components/membranes 48 obtained through this procedure may then be assembled into a membrane electrode assembly 12. The resulting MEA 12 can then be sandwiched between other components such as a pair of gas flow field/bipolar plates 26, 34 to form a single fuel cell 10.

The above description is intended to be illustrative, and not restrictive. While various specific embodiments have been presented, those skilled in the art will recognize that the disclosure can be practiced with various modifications within the spirit and scope of the claims. While the dimensions and types of materials described herein are intended to be illustrative, they are in no way limiting and are exemplary embodiments. Moreover, in the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular" or "generally circular", these adverbs mean "for the most part", "to a significant extent" and/or "to a large degree", and do not necessarily mean "perfectly", "completely", "strictly" or "entirely". For example, a "substantially circular shape" can include one or more of the following: a perfect circle; an ellipse whose major and minor axes have lengths within about 10% of each other; an undulatory shape that has an overall circular or nearly circular elliptical shape; and a foregoing shape whose perimeter, in whole or in part, includes deviations inward and/or outward from the overall circular, nearly circular elliptical or undulatory shape.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A membrane electrode assembly component, comprising:
 a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter;
 wherein the active region includes a distribution of nanofibers made of a compound of cerium-zirconium oxide dispersed across at least one of the in-plane and through-plane directions.

2. The membrane electrode assembly component according to claim 1, wherein the distribution is substantially uniform across file at least one of the in-plane and through-plane directions.

3. The membrane electrode assembly component according to claim 1, wherein the distribution varies across the at least one of the in-plane and through-plane directions.

4. The membrane electrode assembly component according to claim 1, wherein the cerium-zirconium oxide nanofibers have a molecular formula of $CeZrO_4$ or $Ce_{0.5}Zr_{0.5}O_4$.

5. The membrane electrode assembly component according to claim 1, wherein the cerium-zirconium oxide nanofibers have an average fiber length of about 10-900 nm.

6. The membrane electrode assembly component according to claim 1, wherein the distribution is disposed as a coating on a surface of the active region.

7. The membrane electrode assembly component according to claim 1, wherein the distribution is disposed throughout a volume of the active region.

8. The membrane electrode assembly component according to claim 1, wherein the membrane electrode assembly component comprises one of a polymer-electrolyte membrane, a gas diffusion layer, a micro-porous layer, a catalyst layer and a subgasket.

9. The membrane electrode assembly component according to claim 1, wherein the cerium-zirconium oxide nanofibers are made of a composite compound of cerium oxide and zirconium oxide.

10. A membrane electrode assembly component, comprising:
 a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter;
 wherein the active region includes a distribution of cerium-zirconium oxide nanofibers having a molecular formula of one of $CeZrO_4$ and $Ce_{0.5}Zr_{0.5}O_4$ dispersed across at least one of the in-plane and through-plane directions.

11. The membrane electrode assembly component according to claim 10, wherein the distribution is substantially uniform across the at least one of the in-plane and through-plane directions.

12. The membrane electrode assembly component according to claim 10, wherein the distribution varies across the at least one of the in-plane and through-plane directions.

13. The membrane electrode assembly component according to claim 10, wherein the cerium-zirconium oxide nanofibers have an average fiber length of about 10-900 nm.

14. The membrane electrode assembly component according to claim 10, wherein the distribution is disposed as at least one of (i) a coating on a surface of the active region and (ii) a distribution throughout a volume of the active region.

15. A membrane electrode assembly for a fuel cell, comprising:
 a polymer-electrolyte membrane sandwiched between an anode and a cathode; wherein at least one of the polymer-electrolyte membrane, the anode and the cathode has
 a generally planar gas-permeable body having opposed first and second faces defining in-plane directions and a through-plane direction, a side face extending about an outer perimeter of the body and adjoining each of the first and second faces, and an active region bounded in the through-plane direction by the first and second faces and in the in-plane directions by an active region perimeter defined generally within the outer perimeter;
 wherein the active region includes a distribution of nanofibers made of a compound of cerium-zirconium oxide dispersed across at least one of the in-plane and through-plane directions.

16. The membrane electrode assembly according to claim 15, wherein the distribution is substantially uniform across the at least one of the in-plane and through-plane directions.

17. The membrane electrode assembly according to claim 15, wherein the distribution varies across the at least one of the in-plane and through-plane directions.

18. The membrane electrode assembly according to claim 15, wherein the distribution is disposed as at least one of (i) a coating on a surface of the active region and (ii) a distribution throughout a volume of the active region.

19. The membrane electrode assembly component according to claim 15, wherein the cerium-zirconium oxide nanofibers have an average fiber length of about 10-900 nm.

* * * * *